(12) United States Patent
Jouper (10) Patent No.: US 10,142,158 B2
(45) Date of Patent: Nov. 27, 2018

(54) AUTO ADDRESS AND CONFIGURATION OF A MULTI-DROP COMMUNICATION SYSTEM INCLUDING AUTOMATIC TERMINATION OF SAME

(71) Applicant: Astronics Advanced Electronic Systems Corp., Kirkland, WA (US)

(72) Inventor: Jeffrey A. Jouper, Newcastle, WA (US)

(73) Assignee: Astronics Advanced Electronic Systems Corp., Kirkland, WA (US)

( * ) Notice: Subject to any disclaimer, the term of this patent is extended or adjusted under 35 U.S.C. 154(b) by 0 days.

(21) Appl. No.: 15/719,054

(22) Filed: Sep. 28, 2017

(65) Prior Publication Data

US 2018/0097685 A1   Apr. 5, 2018

Related U.S. Application Data

(60) Provisional application No. 62/404,425, filed on Oct. 5, 2016.

(51) Int. Cl.
*H04L 29/12* (2006.01)
*G06F 12/06* (2006.01)

(52) U.S. Cl.
CPC .... *H04L 29/12254* (2013.01); *G06F 12/0669* (2013.01); *G06F 12/0676* (2013.01); *H04L 29/1232* (2013.01); *H04L 61/2092* (2013.01); *G06F 2213/0052* (2013.01); *H04L 61/2038* (2013.01)

(58) Field of Classification Search
None
See application file for complete search history.

(56) References Cited

U.S. PATENT DOCUMENTS 5,204,669 A * 4/1993 Dorfe ................ G06F 12/0676
340/12.23
5,671,387 A * 9/1997 Jacobs ................ B60J 1/2016
710/240

(Continued)

FOREIGN PATENT DOCUMENTS

WO   WO-2018067623 A1 *   4/2018   ....... H04L 29/12254

OTHER PUBLICATIONS

'Quality of Service IP Cabin Infrastructure' by Emanuel Heidinger et al., copyright 2010, IEEE. (Year: 2010).*

(Continued)

*Primary Examiner* — Steven G Snyder
(74) *Attorney, Agent, or Firm* — Wiggin and Dana LLP; Gregory S. Rosenblatt (57) ABSTRACT

The application of this method is an addressable lighting control system using the In Seat Power Supply as an interface between the passenger control device for lighting and the aircraft Cabin Services System. On wide body aircraft, there does not exist a system to control the reading and attendant call lights without installing a complete In Flight Entertainment system. This is a part of the system used to communicate from a passenger interface to the lighting system based on location of the passenger in the aircraft. This invention decreases the weight and complexity of other communication and addressing schemes used on-board aircraft as well as obviating the need for termination plugs or jumpers at the end of the multi-drop communication line.

12 Claims, 5 Drawing Sheets

A system to control passenger lighting on a typical wide body aircraft.

(56) References Cited

U.S. PATENT DOCUMENTS

| | | | | |
|---|---|---|---|---|
| 5,745,159 | A * | 4/1998 | Wax | H04H 20/12 |
| | | | | 455/14 |
| 5,854,591 | A | 12/1998 | Atkinson | |
| 6,058,288 | A * | 5/2000 | Reed | B64D 11/0015 |
| | | | | 348/E7.05 |
| 6,131,119 | A * | 10/2000 | Fukui | H04L 12/40078 |
| | | | | 709/224 |
| 6,163,823 | A * | 12/2000 | Henrikson | H04L 12/403 |
| | | | | 700/95 |
| 7,487,938 | B2 * | 2/2009 | Brady, Jr. | H04L 61/2038 |
| | | | | 244/118.5 |
| 8,296,488 | B2 | 10/2012 | Westrick, Jr. et al. | |
| 8,700,747 | B2 | 4/2014 | Spitaels et al. | |
| 9,965,931 | B2 * | 5/2018 | Reinbold | G08B 7/00 |
| 2003/0217363 | A1 | 11/2003 | Brady, Jr. et al. | |
| 2005/0268319 | A1 | 12/2005 | Brady, Jr. | |
| 2005/0273823 | A1 * | 12/2005 | Brady, Jr. | H04L 61/2038 |
| | | | | 725/76 |
| 2006/0246892 | A1 | 11/2006 | vonDoenhoff et al. | |
| 2010/0072904 | A1 | 3/2010 | Eckel et al. | |
| 2010/0274945 | A1 | 10/2010 | Westrick, Jr. et al. | |
| 2013/0147373 | A1 | 6/2013 | Eckel et al. | |
| 2016/0179151 | A1 | 6/2016 | Ibrahim et al. | |
| 2018/0075717 | A1 * | 3/2018 | Reinbold | G08B 7/00 |

OTHER PUBLICATIONS

WIPO, PCT/US17/55016, International Search Report, dated Dec. 28, 2017.
WIPO, PCT/US 17/55016, Office of Earlier Examination (OEE) Work Product, dated Dec. 28, 2017.

* cited by examiner

FIG. 1

A system to control passenger lighting on a typical wide body aircraft.

FIG. 2  Two columns, three devices per column

AUTO ADDRESS AND CONFIGURATION OF A MULTI-DROP COMMUNICATION SYSTEM INCLUDING AUTOMATIC TERMINATION OF SAME

CROSS-REFERENCE TO RELATED PATENT APPLICATIONS

This patent application claims a benefit to the filing date of U.S. Provisional Patent Application Ser. No. 62/404,425, that was filed on Oct. 5, 2016 and is titled "Auto Address and Configuration of a Multi-Drop Communication System Including Automatic Termination of Same." The disclosure of U.S. 62/404,425 is incorporated by reference herein in its entirety.

BACKGROUND

Field

Disclosed herein are a system and a method to mitigate the added weight of token addressing and the logistical costs of unique addresses of seat assemblies by pin addressing.

Description of Related Art

Serial communication has been used for many years in the development of systems with a required interconnect for intelligent control. In particular, the RS-485 full-duplex communication standard is highly popular for its robust communication over long distances of up to 4000 meters. With proper control, the RS-485 communication system is capable of communicating with many devices in parallel, such as broadcast commands to all devices on a bus, simultaneously. Each device on the bus only responds to the specific address assigned to that device and only listens to broadcast commands. Many addressing techniques have been used over the years with an RS-485 physical layer interface. Of these, hardwired addressing by use of address pin programming, tokens in parallel with the communication lines and randomly generated addresses are among the most popular. Each has merits and drawbacks.

Hardwired addressing requires each device on the chain to have an address unique to that device assigned either externally or internally. Hardwire addressing works well as an address method in some applications. However, in an aircraft cabin, where devices need to be assigned to a specific physical location, mapping the function of that device to a function on the aircraft (such as reading lights), requires each device in a string to have a unique address. This causes the wiring harness connected to each device to require a unique address assigned by strapping, programming by pin selectable configuration, local switch array or pre-programming of the device depending on its location. In turn this causes each cable harness to require a unique addressing plug to be assigned to that location or local programming of a unit address based on its location. Therefore, the configuration of each seat group is unique to its location and address on the aircraft. Ensuring each device and each harness is mapped properly by location is a logistical problem that is exacerbated by unique seat configurations and a need to properly address each seat group. Hardwire addressing for aircraft cabin electronics is error prone and some applications require user intervention to assign an address.

Use of a token line requires a secondary connection in parallel with the communication lines. While the use of a token signal renders location of a device on a multi-drop architecture by passing the token from device to device, the need for a secondary connection adds unnecessary weight to the system by requiring that the token signal be present even when it is not required for the operation of communication. This signal is only used to arbitrate the address. The signal is then not needed from that point forward unless re-addressing is required. Therefore, this adds unnecessary weight to the aircraft.

U.S. Pat. No. 8,700,747, titled "System and Method for Automatically Addressing Devices in a Multi-Drop Network," by Spitaels et al. discloses randomly generated addresses that do not require a token signal and mitigate the weight issue. The system requires an anti-collision algorithm to ensure two units do not share a common arbitrarily selected address. This type of addressing is not effective to render the physical location of a unit in a multi-drop communication bus.

U.S. Pat. No. 8,296,488, titled "Automatic Self-Addressing Method for Wired Network Nodes," by Westrick, Jr. et al. discloses a plurality of nodes that communicate on a two-way communication bus. Each node includes a switch that is initially open. A controller sends a start self-address command to a first node which sets an address as "x" and then closes its switch. The closed switch enables the controller to communicate with the second node that sets its address as "x+1" and then closes its switch enabling communication with the third node and so on until all nodes have self-addressed.

Both U.S. Pat. No. 8,700,747 and U.S. Pat. No. 8,296,488 are incorporated by reference herein in their entireties.

An issue is still unresolved for reduced physical hardware, unique cabling and being able to assign a unique address dynamically while mapping exact location of a specific unit in a multi-drop system. Neither patent discussed above solves a fault tolerant need in an aircraft environment where a failure of a unit on the bus will not interrupt the communication or cause the incorrect reassignment of addresses. All aircraft are weight sensitive and commercial aircraft are plagued with unique harnesses and seat part numbers.

BRIEF SUMMARY

The application of this method is an addressable lighting control system using an In-Seat Power Supply as interface between a passenger control device for lighting and the aircraft Cabin Services System. On wide body aircraft, there does not exist a system to control the reading and attendant call lights without installing a complete In-Flight Entertainment System. This is a part of the system used to communicate from a passenger interface to the lighting system based on location of the passenger in the aircraft. The system disclosed herein decreases weight and complexity when compared to other communication and addressing schemes used on-board aircraft. The system further obviates a need for termination plugs or jumpers at the end of a multi-drop communication line.

DETAILED DESCRIPTION

Figure 1:
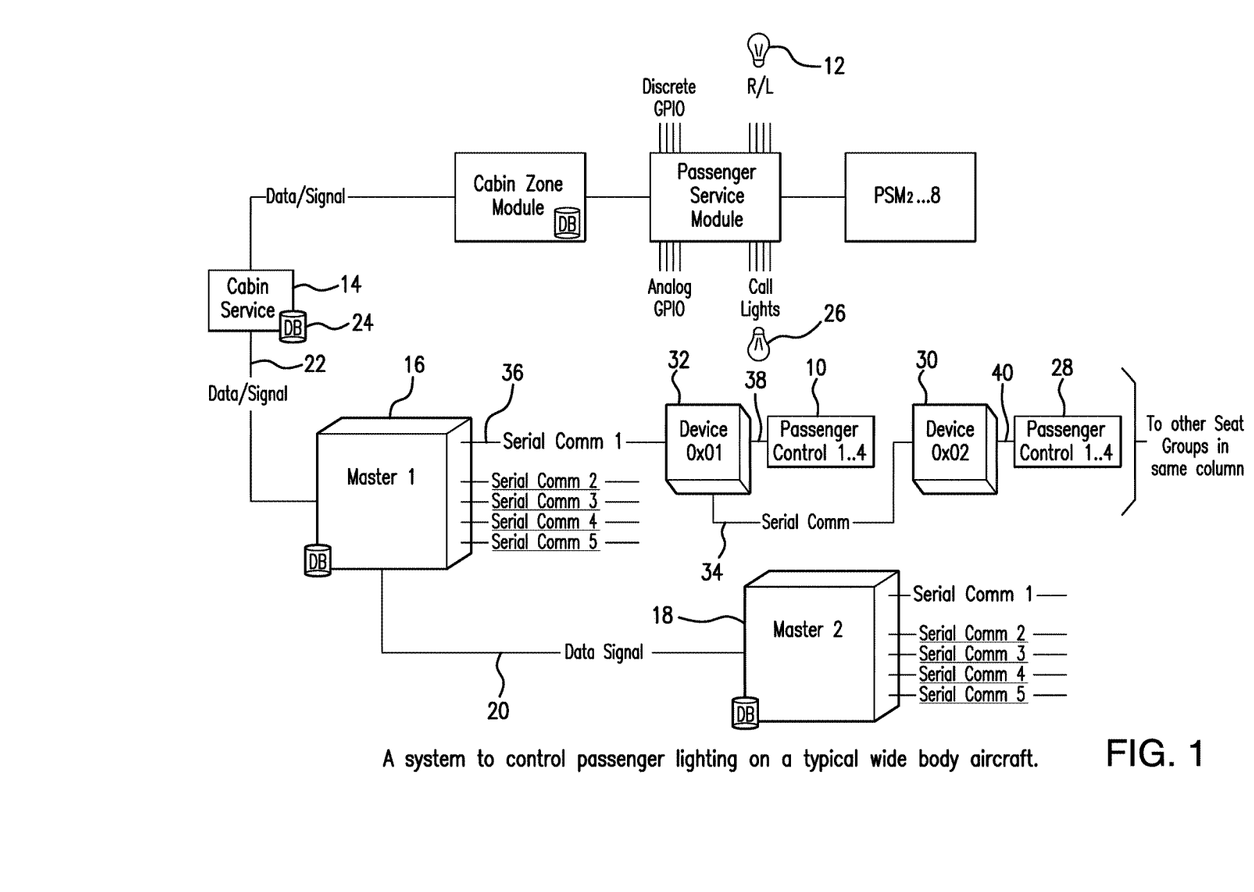
FIG. 1 depicts a passenger service system on an aircraft.

FIG. 1 depicts a passenger service system on an aircraft. A passenger control unit 10 is a passenger/aircraft interface used by the passenger to control overhead reading lights 12. The cabin service server 14 is a data server used to control the passenger service system based on data supplied by the master units 16, 18 attached to the cabin service server 14. The master units 16, 18 are typically daisy chained 20 together for data using 1000 Base T Ethernet (gigabit) and then to a single interface 22 on the cabin service server 14. Although, in an alternative embodiment, multiple inputs (not shown) could also be used at the cabin service server 14.

A database 24 in the cabin service server 14 maps the master units 16, 18 to zones within the aircraft. The cabin service server 14 connects point to point with the first master unit 16. Each subsequent master unit 18 is daisy chained 20 from master unit 1 16 in line. Each master unit 16, 18 controls an area or zone of the aircraft corresponding to a number of rows of seats.

An exemplary operation of this system is as a passenger is seated in a seat, there is a corresponding passenger control unit 28 used to interface with the passenger for control of the lighting (reading light 12 and call light 26). If the passenger depresses a button on the passenger control unit 28, this is sensed by a seat device at for example seat device 0x02 (reference numeral 30). Master unit 1 16 provides a polling of each seat device 30, 32 at a specified frame rate. This frame rate is determined by the bus speed and the amount of data to be transacted during a polling period. With thirty seat devices operating at 1 Mega Bit per second, a typical transaction to a seat device is 28 bits of information in the request status from the master unit 16, a dead space of 25 uSec (time to process the message and formulate a return message), a 28 bit return of data for a total of 81 uS per transaction. With a 100 uS frame rate (the frame rate must be greater than the total transaction time of 81 uS) and a total of 30 units to transact, 3000 uS are used to poll a complete serial multi-drop communication column. The number of bits per transaction can vary depending on the information to be sent and received as well as the polling rate based on the total transactions within a complete polling period. Each master unit 16, 18 can perform the polling of all serial ports assigned during the same period or in parallel. The amount of time for a complete poll of transactions defines the latency of getting the message from the passenger control units 10, 28 to the master units 16, 18. Master units 16, 18 in turn send data over a high speed network 20 to the cabin service server 14 to translate the message to an action of controlling a corresponding light 12, 26.

Seat devices 30, 32 can have as many interfaces to passenger control units 10, 28 as are required for the number of seats in the group. Some groups contain as many as five seats abreast. Typical is one to four seats. Each seat device 30, 32 has a serial communication 34, 36 to an upstream device and an interruptible output serial communication 38, 40 to a downstream device.

The passenger control units 10, 28 are hard coded for an address according to which port on the seat device 30, 32 it is connected to. Port 1 will typically be the lowest number passenger in that seat group. As an example, Row 23 seat A would be attached to Port 1 of the seat device 30 while Row 23, seat C would be attached to Port 3.

Figure 2:
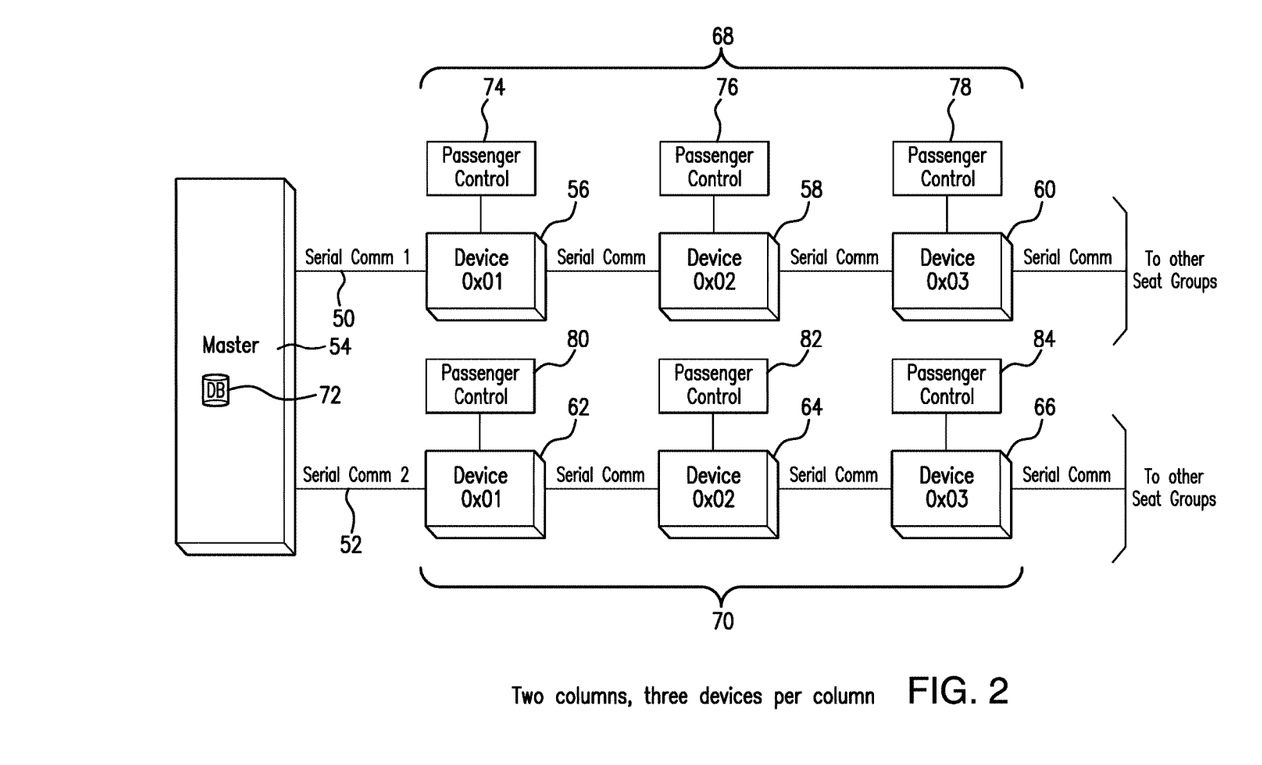
FIG. 2 depicts an exemplary system with two serial communication busses.

FIG. 2 depicts a small system with two serial communication busses 50, 52. The number of downstream serial busses at the master unit 54 is a design choice depending on the number of individual serial communication busses 50, 52 required. The number of serial communication busses 50, 52 selected typically will align with the number of power columns providing power to the seat devices 56, 58, 60, 62, 64, 66. Power is daisy chained from the sidewall (entry into the cabin) to a first seat group 68 and then from that first seat group 68 to a second seat group 70 in that area. The master unit 54 contains a database 72 in non-volatile memory of the expected configuration (number of devices to address per bus) and the final address map at the end of auto addressing (how many actually reported). When completed the device address has been set and is known by the database 72 which devices 56, 58, 60, 62, 64, 66 at which seats correspond to which passenger control units 74, 76, 78, 80, 82, 84. Multiple passenger control units can be assigned to a single seat device such as three passenger controls for one device in a seat group. Automatic addressing and/or communication can be accomplished on both communication paths simultaneously or at individual times.

Once automatic addressing is complete, the master unit 54 initiates a status request from the first seat device 56 in the chain. Address 0x01 is queried and may respond with no status change or a status change with status change type. The status change contains the address of the responding passenger control unit 74, if a button has been pressed on the passenger control unit 74 and returns this to the master unit 54. The master unit 54 concatenates which seat device 56 it is, which serial communication bus 50 it is communicating on and the data received from the seat device 56 to produce a message stream to the cabin services server (14 in FIG. 1) operating the lights (12, 26 in FIG. 1). The cabin services server database (24 in FIG. 1) contains the locations of the master units 54 and from the data retrieved from the seat device units 56-66, the corresponding information is used to map with the overhead lighting to send a message to the appropriate overhead light to change its status based on the passenger input at the passenger control unit 74.

Figure 3A:
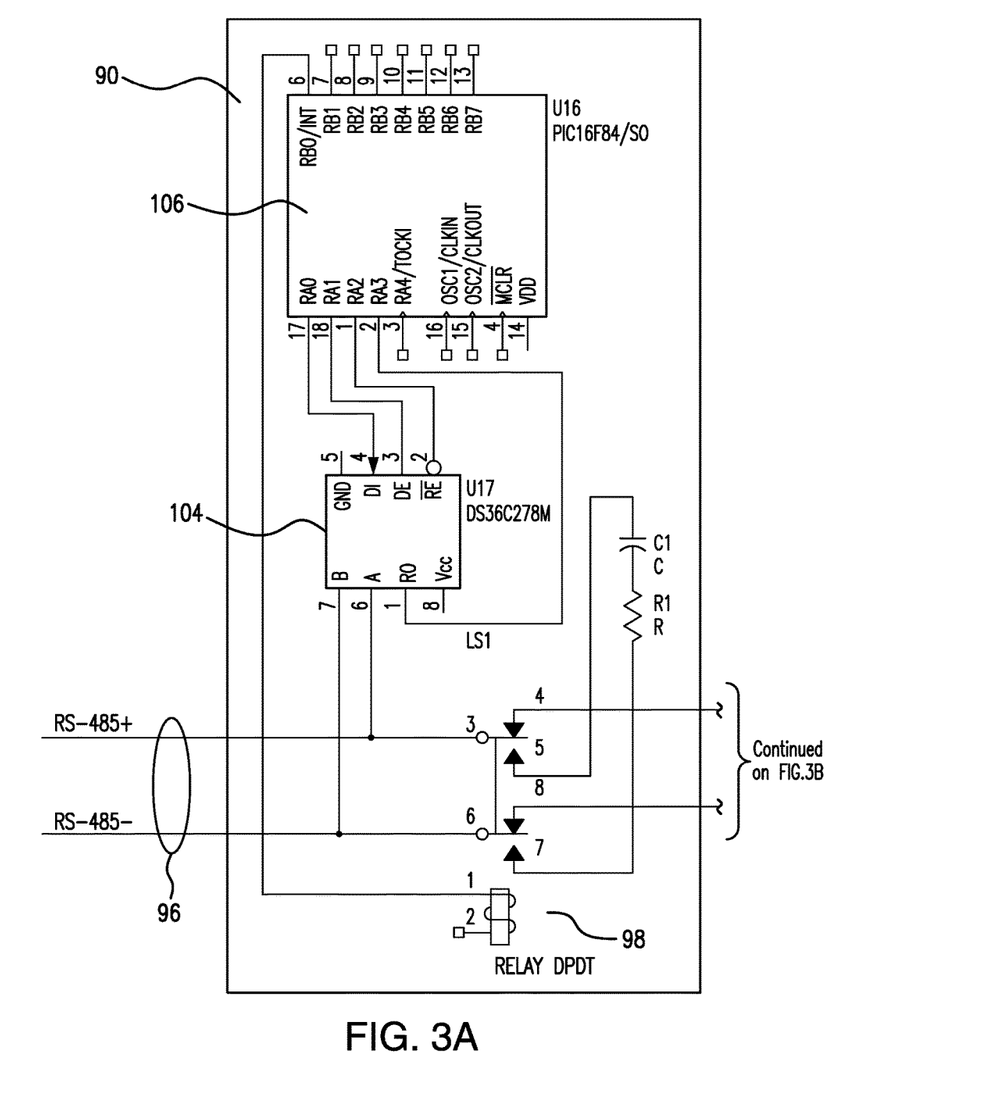
FIG. 3A depicts a method of addressing a first device.
Figure 3B:
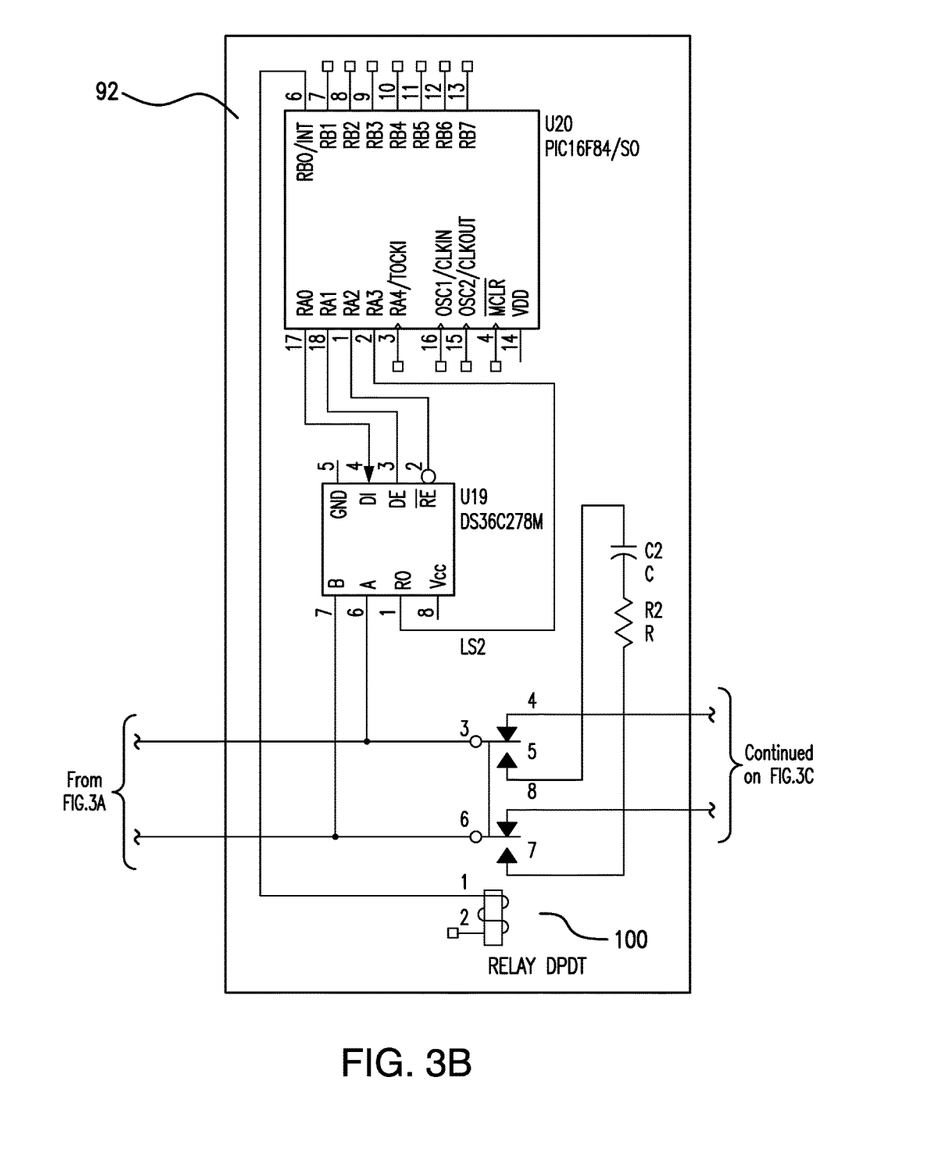
FIG. 3B depicts a method of addressing a second device.
Figure 3C:
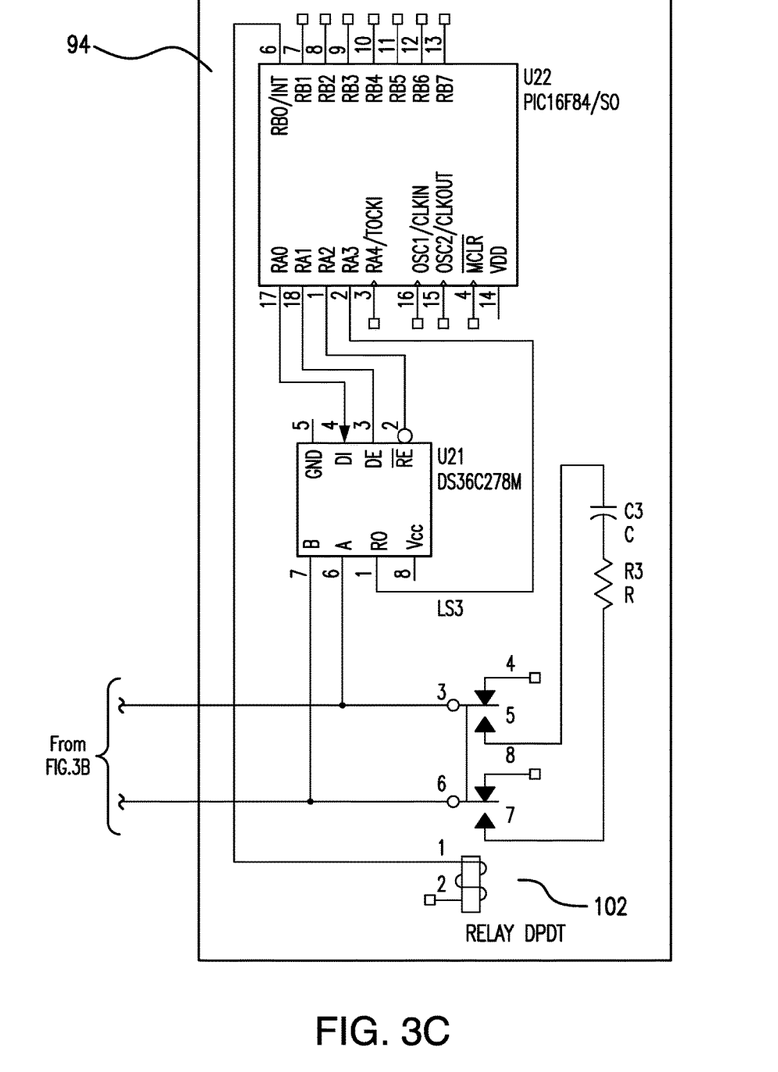
FIG. 3C depicts a method of addressing a second device.

With reference to FIGS. 3A-3C, addressing is described for three devices 90, 92, 94 on an RS-485 multi-drop system. This method of addressing removes the need for address strapping and automatically terminates the column when the address assignment is complete. Termination of the multi-drop bus is required to properly reduce reflections of data transitions. Termination impedance is based on the propagation of the signal through the cable and time for settling of the signal reflections. This is much more critical as data rates increase and cable lengths increase. A generally good termination is typically 100 Ohms as defined by many specifications and works well for shorter runs nominally with a length of up to 50 meters and higher speed data nominally with a speed in excess of 500K bits per second. Slow speed data can often be left unterminated.

In an example system, a total of 32 hexadecimal addresses are selectable 0x00 through 0x1F, logical addresses 0 through 31 render 32 total address. Address 0x00 (0) is typically reserved for point to point communication between a master unit and a single slave unit. This is done since no other devices require communication and there is an assigned master unit and an assigned slave unit. The master unit always controls the flow of communication. With any system greater than two devices, the system becomes a multi-drop system. Address 0x1F (31) is reserved for broadcast communications used to address all devices on the multi-drop interface simultaneously. Every device on the bus will listen for their assigned address or broadcast address and respond accordingly. Devices detecting the broadcast address 0x1F do not respond to the master unit however to perform the task contained in the data portion of broadcast command. This leaves N−2 addresses for devices on the column. The master unit will always be address 0x00, broadcast at 0x1F and a total of 30 addressable devices on the bus for this example system. The addressable space is not limited to 32 physical addresses, this is limited by the number a data bits in the header of the message dedicated to the address. A single 8-bit word will render N−2 addresses or 254 total addressable devices in a multi-drop. Other limitations will be physical length between devices, signal integrity based on the number of transceivers on the bus etc. All are limitations to the number of devices addressable and one skilled in the art of data bus design will reflect on all of these points.

Additional consideration should be made to the required data rate to perform the tasks the system is required to perform. Data rates can be increased to increase the throughput of collecting data and performing tasks with commensurate increases in processing power in the devices to be addressed.

Using this specification it is possible to do an auto-configure for a multi-drop system and know the location of each device within the system. The serial bus 96 is physically attached from the Master to the first slave 90, then from that first slave 90 to the next in turn slave 92 until all devices are attached to the multi-drop bus. In some prior art systems a token would follow in parallel to the data communication and each device would propagate the token to the next device as part of address assignment. This invention removes that portion of the system and corresponding weight.

In this example, during power ON all devices 90, 92, 94 set their address to 0x00 and "SET" their bypass relay 98. Setting the relay effectively opens the communication bus 96 with the exception of the first device 90 in the string. This allows a point to point communication with first device 90 in the string.

1. The bus Master sends a point to point command address 0x00 to the first device 90 to set its address to 0x01.
2. First device 90 sends an ACK back and the Master then sends for Power On Status (POS) to address 0x01.
3. First device 90 sends back an ACK including addition power ON information.
4. The bus Master sends a reset relay to 0x01.
5. First device 90 closes its relay 98 and sends back ACK.
6. The bus Master sends a point to point command to the second device 92 to set its address to 0x02.
7. Second device 92 sends an ACK back and the Master then sends a Power On Status (POS) to address 0x02.
8. Second device 92 sends back an ACK including addition power ON information.
9. The bus Master sends a reset relay to 0x02.
10. Second device 92 closes its relay 100 and sends back ACK.
11. The bus Master sends a point to point command to the third device 94 to set its address to 0x03.
12. Third device 94 sends an ACK back and the Master then sends a Power On Status (POS) to address 0x03.
13. Third device 94 sends back an ACK including addition power ON information.
14. The bus Master sends a reset relay to 0x03.
15. Third device 94 closes its relay 102 and sends back ACK.
16. A point to point command to address 0x00 is sent again but there will not be an ACK as a device does not exist.
17. The last address 0x03 is then commanded to "SET" its relay 102 again which terminates the bus.
18. This completes the addressing of devices and the system is ready to enter operation.

Anytime a device 90, 92, 94 on the serial bus 96 has a microcontroller failure, software failure, check sum failure or is totally dead, the relay 98, 100, 102 associated with that device is "RESET" to the normally closed position and the defective device will not respond on the serial bus 96 as the microcontroller will be in RESET or off status. The closed relay allows the bus to still operate as normal to the other devices but the Master will note that the address is non-responsive and can send that information for maintenance to a server or communicate to a separate network to alert for maintenance. This allows for pinpoint accuracy of where on the bus a device is malfunctioning.

The address assigned as part of arbitration during this process may be stored in non-volatile memory 106 to allow the system to power up each time with the same configuration and then compare the power up results with a system location table stored in the master unit. It could also be that the system performs the addressing at power on of the system each time powered up. This allows for a device to be replaced and the new device to auto-address. A commanded auto-address could be performed should the master unit be commanded by system or human intervention to completely re-address the system.

Microprocessor 106 is programmed to determine the address of RS-485 transceiver and also contains the operating code for that transceiver.

The relay 102 could be an electromechanical or solid state device. As long as it is suitable to allow data to pass through unobstructed when power is not available to the device it is in and interrupt data communication when in the addressing mode.

I claim:

1. A system to address and locate a device on a multi-drop bus structure without the use of a token signal, comprising:
a first master unit in communication with a cabin service server and with one or more second master units, each master unit further including a database mapping an expected configuration of seat devices and associated passenger control units;
the cabin service server in communication with one or more passenger service modules, each passenger service module electrically controlling one or more electrical devices;
the first master unit and each second master unit in communication with a separate zone of the seat devices, each seat device in communication with one or more of the passenger control units;
wherein toggling a switch on a particular passenger control unit is associated with a change in status of a particular one of the electrical devices; and
wherein each master unit assigns an address to each seat device in its zone and forwards those addresses to the cabin service server and the cabin service server matches each seat device address to a passenger service unit.

2. The system of claim 1 wherein when there are more than one second master unit, they are electrically interconnected by a daisy chain.

3. The system of claim 2 wherein each seat device includes a relay.

4. The system of claim 3 wherein when said relay is open, either the seat device does not have an assigned address or the seat device is defective.

5. The system of claim 3 wherein when said relay is closed, said master unit is in communication with the next seat device in the zone.

6. The system of claim 5 wherein there is an automatic termination of the addressing when the last seat devices in a zone has been assigned an address.

7. A method to address and locate a device on a multi-drop bus structure without the use of a token signal, comprising:
providing a first master unit in communication with a cabin service server and with one or more second master units, each master unit further including a database mapping an expected configuration of seat devices and associated passenger control units;
the cabin service server communicating with one or more passenger service modules, each passenger service module electrically controlling one or more electrical devices;
the first master unit and each second master unit communicating with a separate zone of the seat devices, each seat device communicating with one or more of the passenger control units;
wherein toggling a switch on a particular passenger control unit is associated with a change in status of a particular one of the electrical devices; and
wherein each master unit assigns an address to each seat device in its zone and forwards those addresses to the cabin service server and the cabin service server matches each seat device address to a passenger service unit.

8. The method of claim 7 wherein following addressing, each master unit initiates a status request from a first seat device in a zone.

9. The method of claim 8 wherein a status change by a particular seat device causes a particular electrical device to change status.

10. The method of claim 9 including selecting said particular electrical device to be a light associated with a seat in a cabin of a passenger aircraft.

11. The method of claim 8 wherein after polling a seat device in the zone, the next subsequent seat device in the same zone is polled for a status change.

12. The method of claim 11 wherein polling terminates when the last seat device in a zone is polled for a status change.

* * * * *